United States Patent
Sickler, Jr.

(10) Patent No.: US 8,931,816 B2
(45) Date of Patent: Jan. 13, 2015

(54) METAL DETECTOR DIGGING TOOL APPARATUS

(71) Applicant: Robert L. Sickler, Jr., Longwood, FL (US)

(72) Inventor: Robert L. Sickler, Jr., Longwood, FL (US)

(*) Notice: Subject to any disclaimer, the term of this patent is extended or adjusted under 35 U.S.C. 154(b) by 36 days.

(21) Appl. No.: 13/914,971

(22) Filed: Jun. 11, 2013

(65) Prior Publication Data

US 2014/0361563 A1 Dec. 11, 2014

(51) Int. Cl.
*A01B 1/00* (2006.01)
*A01D 9/00* (2006.01)
*A01D 11/00* (2006.01)
*A01B 1/02* (2006.01)

(52) U.S. Cl.
CPC .................................... *A01B 1/022* (2013.01)
USPC ........................................... 294/59; 294/190

(58) Field of Classification Search
CPC ............ A01B 1/02; A01B 1/18; H01F 7/206; B25J 1/04; B25G 1/00; G01V 3/15; G01V 3/08; G01V 3/081; G01V 3/104; E21B 47/02224; F24B 15/08; B07B 1/02; B07B 1/46; A01K 1/0114; A47J 43/22
USPC ................ 294/24, 49, 58, 176, 181, 59, 50.8, 294/50.9, 219, 65.5, 190; 324/326–329, 324/226, 269; 209/417–419
See application file for complete search history.

(56) References Cited

U.S. PATENT DOCUMENTS

| 4,359,686 | A | * | 11/1982 | Wherry ......................... 324/326 |
| 4,983,281 | A |   | 1/1991 | Montelione |
| 5,132,622 | A | * | 7/1992 | Valentino ...................... 324/326 |
| 7,575,065 | B1 |   | 8/2009 | Podhrasky |
| 8,162,363 | B2 | * | 4/2012 | Wang ............................ 294/65.5 |
| 2010/0321021 | A1 | * | 12/2010 | Siegel ............................ 324/329 |

* cited by examiner

*Primary Examiner* — Stephen Vu
(74) *Attorney, Agent, or Firm* — William M. Hobby, III

(57) ABSTRACT

A metal detector digging tool apparatus has an elongated pole having a nonmetallic digging tool or scoop attached to one end thereof and a nonmetallic bracket removably clamped between the ends thereof. The nonmetallic bracket clamps to the pole between the ends thereof and has a metal detector clamp extending therefrom that clamps a pinpoint metal detector to said bracket adjacent the nonmetallic digging tool for remotely isolating and examining an object detected by a metal detector without the operator bending or kneeling over.

6 Claims, 2 Drawing Sheets

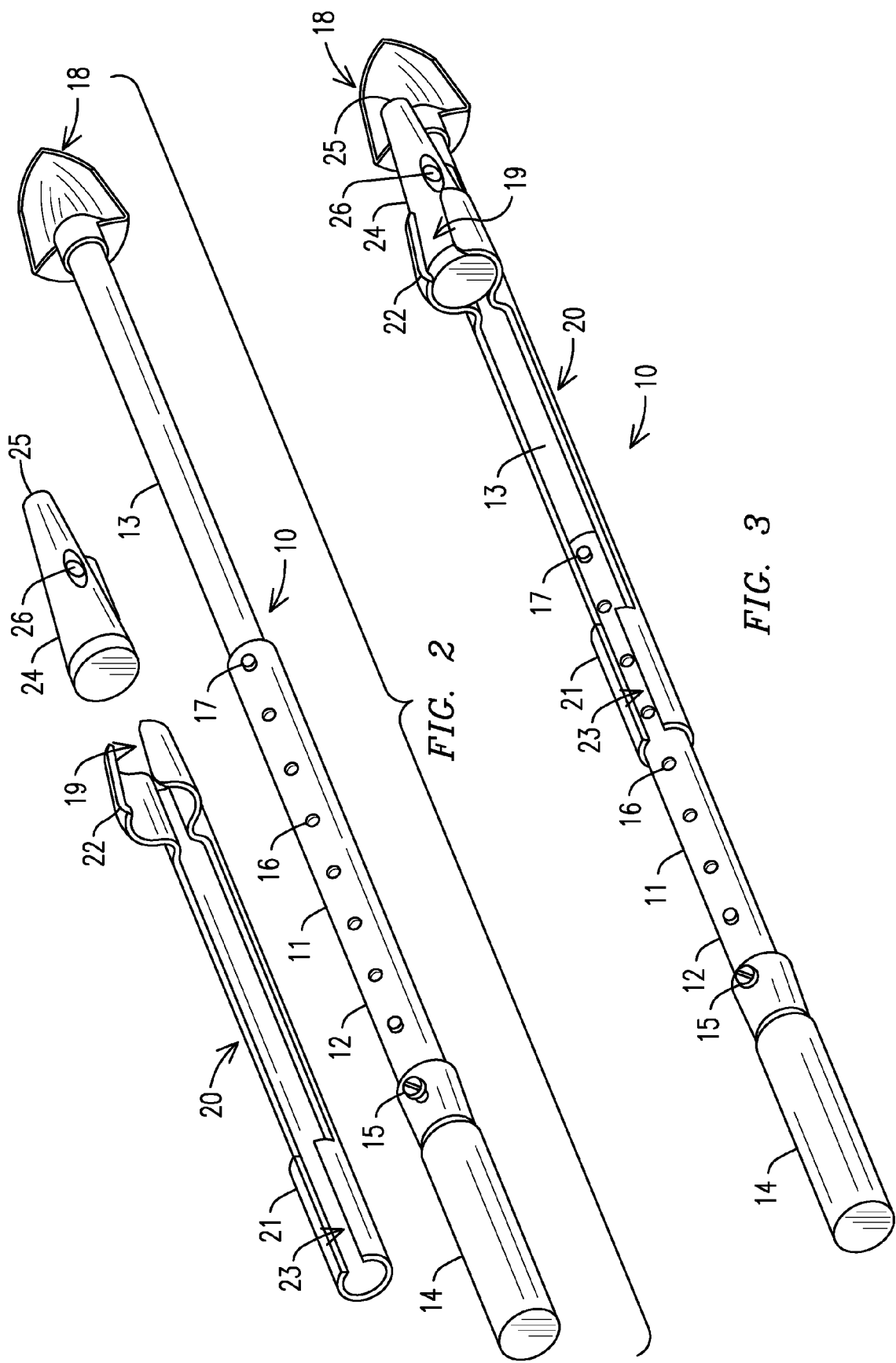

METAL DETECTOR DIGGING TOOL APPARATUS

FIELD OF THE INVENTION

This invention is related to a metal detector digging tool having a scoop on an elongated pole and having a pinpoint metal detector attached to one end of the pole with quick releasing bracket.

BACKGROUND OF THE INVENTION

Metal detectors generally consist of an elongated pole with a detecting head at one end and electronic unit on the other end. They are often used over soft earth and sandy beaches to recover lost or hidden metal objects buried beneath the surface. The user may carry along a digging tool, such as a scoop or shovel, to dig through the earth or sand at a location found by the detector. The digging tool may be perforated in some cases to let loose sand or dirt pass through while retaining small solid or metal items. The operator generally needs both hands to use the digging tool so that the metal detector is laid aside. Once a metal object is detected, the operator must lay the metal detector aside and bend over or get on his knees to use the scoop or shovel. Also if the scoop or shovel comes near the metal detector it can give an erroneous reading if the scoop is made of a metal.

Different scoops have evolved which may be used for scooping up dirt and any located metallic objects. Some of these scoops include the use of sifters for letting sand, or the like, go through a sieve in order to collect objects found in the sand. These scoops, digging and sifting tools permit one to dig, scoop and sometimes sift through the various earth mediums. The process is quite tedious with the operator constantly putting the metal detector down and bending or stooping or kneeling down with a pin pointer metal detector and digging tool to locate a detected object.

In U.S. Patent Application Publication No. 2010/0321021 to Siegel, a metal detector excavation apparatus combines a hand scoop with metal detector circuit in the handle thereof for digging and locating a detected object. In the Montelione U.S. Pat. No. 4,983,281 a metal detector scoop sifter adds a sifter scoop to a metal detector by having the scoop slidable on a shaft attached to the metal shaft of the metal detector. The Podhrasky U.S. Pat. No. 7,575,065 is for a hand-held metal detector and soil excavation device for use in locating and retrieving metal objects concealed in soil.

The present invention both simplifies and speeds the process of finding detected metal objects for the user of a metal detector without the user having to bend over or stoop or get down on his knees with each detected item detected by a metal detector.

SUMMARY OF THE INVENTION

This invention relates to a metal detector digging tool apparatus having an elongated pole having a nonmetallic digging tool attached to one end thereof and a nonmetallic bracket removably clamped thereto. The nonmetallic bracket clamps to the pole between the ends thereof and clamps a pinpointing metal detector thereto adjacent the nonmetallic digging scoop for remotely isolating and examining an object detected by a metal detector without the operator bending or kneeling over. The metal detector digging tool apparatus has an elongated telescoping pole having two ends and having a handle on one end thereof and a nonmetallic digging tool or scoop attached to the other end thereof. The nonmetallic bracket is removably clamped to the elongated pole between the ends thereof. The bracket has a clamp extending therefrom sized and positioned for removably attaching a pinpointing metal detector adjacent to the digging scoop head. A pinpointing metal detector for pinpointing a detected metal object is removably attached in the clamp extending from the bracket. The metal detector operator can remotely isolate and examine an object detected by a metal detector without bending over or kneeling or stooping.

BRIEF DESCRIPTION OF THE DRAWINGS

The accompanying drawings, which are included to provide further understanding of the invention, are incorporated in and constitute a part of the specification and illustrate an embodiment of the invention and together with the description serve to explain the principles of the invention.

In the drawings:

FIG. 2 is an exploded perspective of the metal detector digging tool of FIG. 1; and FIG. 3 is a perspective view of the metal detector digging tool of FIGS. 1 and 2.

DETAILED DESCRIPTION OF EXEMPLARY EMBODIMENT

Figure 1:
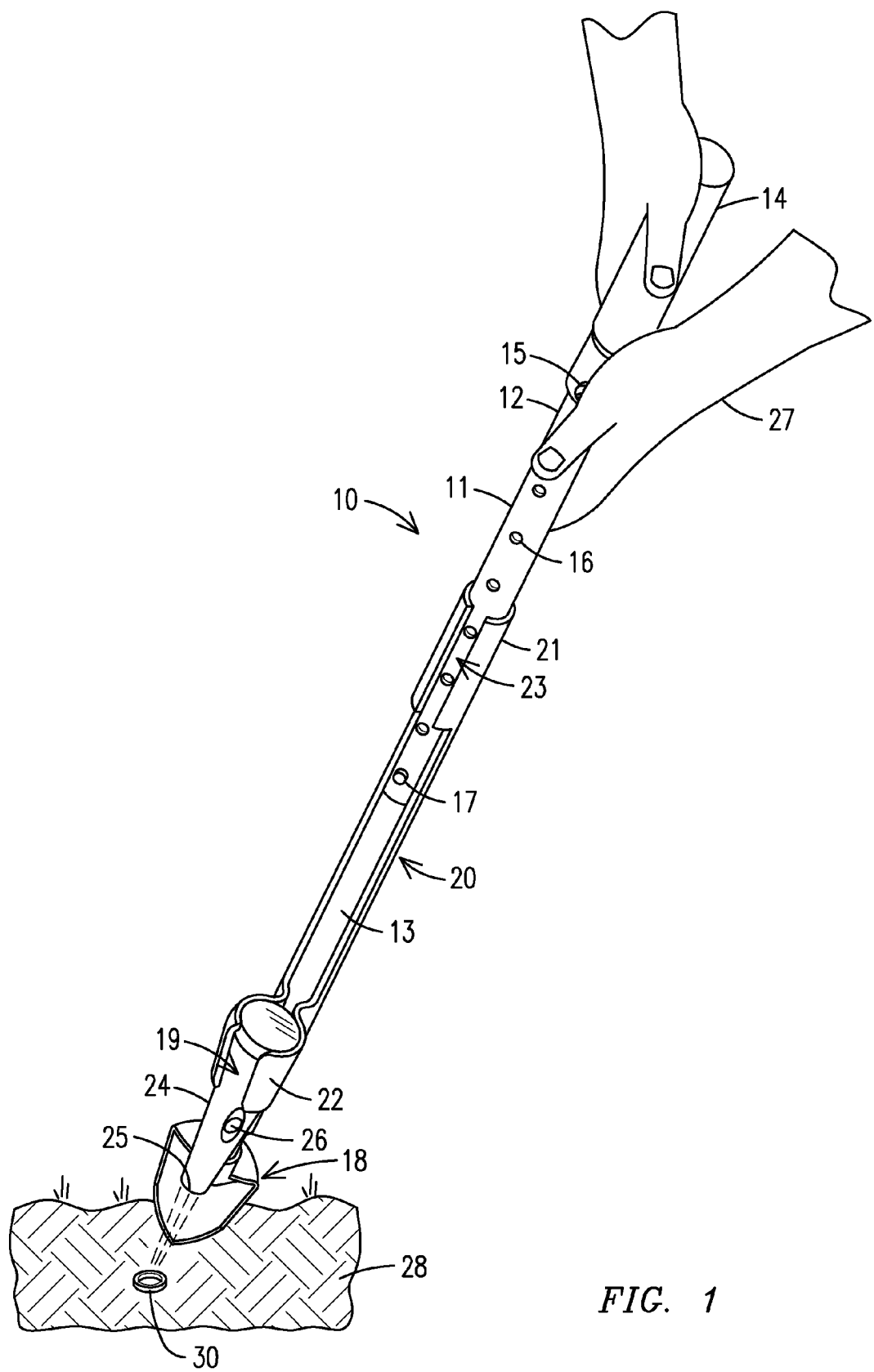
FIG. 1 is a perspective view of a metal detector digging tool in accordance with the present invention shown in use in scooping up a metal object.

This invention relates to metal detector digging tool to assist the user of a metal detector in finding a piece of metal detected with his metal detector without constantly bending over and kneeling to filter through the earth or sand for each detection. Most detections are for minor metal scrap, such as bottle caps and the like, which require constant bending to dig up and find the detected metal.

Referring to FIGS. 1 through 3, a metal detector digging tool 10 has a telescoping elongated rod or pole 11 having a handle end 12 and a telescoping end 13. The handle end has a removably mounted handle 14 thereon mounted with a set screw 15 locking it to the handle end 12 of the pole 11. The handle end 12 of the pole 11 has a plurality of apertures 16 spaced thereon for receiving a spring loaded lock pin 17 from the telescoping end 13 to lock the telescoping pole 11 in position for individual users. The telescoping end 13 of the pole 11 has a digging end or scoop 18 on the end thereof. The digging scoop 18 is made of a polymer or non-metal material to avoid interference with the metal detector.

An elongated bracket 20 has a pole attaching clamp 21 on one end and a pin pointing metal detector clamp 22 on the other end thereof. Clamp 21 is generally round or circular and has an open side 23 to allow the clamp to expand slightly for clamping onto the pole 11. The clamp 22 is also generally round or circular in cross-section with an open side 19 and is tapered to allow a pinpointing metal detector 24 to be clamped therein. The bracket 20 has an arcuate surface to allow it to cradle onto the pole 11 with the clamp 22 protruding therefrom for mounting the pinpointing metal detector 24 to be positioned facing the scoop 18 with its metal detecting end 25. The pin pointing metal detector has a switch 26 for activating the detector. The bracket 20 is made of a polymer or non-magnetic material which can provide a spring or clamping action to the clamps 21 and 22 so as to not interfere with a metal detector.

The operation of the digging metal detector tool can be seen in FIG. 1 being held by a user's hands 27 gripping the handle 14 while standing and scooping into the earth 28. The scoop 18 is inserted into the earth as guided by the pinpointing metal detector 24 towards the detected metal 30 in the earth. The position of the metal detector 24 relative to the scoop allows for finely tuning the location of the metal relative to the earth and allows the user to shovel or scoop up the metal object and adjacent earth without stooping or kneeling and to quickly sort the metal object from the earth.

It should be clear at this time that a metal detector digging tool has been provided. However the present invention is not to be considered limited to the forms shown which are to be considered illustrative rather than restrictive.

I claim:

1. A metal detector digging tool apparatus comprising:
   an elongated pole having two ends and having a handle on one end thereof, wherein said elongated pole is an elongated telescoping pole;
   a nonmetallic digging tool attached to the other end of said elongated pole;
   a nonmetallic bracket removably clamped to said elongated pole between the ends thereof, said bracket having a metal detector clamp extending therefrom sized and positioned for removably attaching a pinpoint metal detector adjacent said digging tool, wherein said nonmetallic bracket snap clamps onto said elongated pole between the ends thereof;
   a pinpoint metal detector for pinpointing a detected metal object removably attached in said metal detector clamp extending from said bracket;
   whereby a metal detector operator can remotely isolate and examine an object detected by a metal detector; and
   wherein said metal detector clamp extending from said bracket snap clamps said pinpoint metal detector thereto.

2. The metal detector digging tool in accordance with claim 1 in which said nonmetallic bracket is a polymer bracket.

3. The metal detector digging tool in accordance with claim 2 in which said telescoping pole has telescoping position locking tabs.

4. The metal detector digging tool in accordance with claim 3 in which said nonmetallic bracket metal detector clamp extending therefrom is generally circular in cross-section and open on one side thereof.

5. The metal detector digging tool in accordance with claim 4 in which said nonmetallic bracket is a generally arcuate pole attaching portion open on one side for removably clamping said pole attaching bracket onto said pole.

6. The metal detector digging tool in accordance with claim 5 in which said handle is removably attached to said pole.

\* \* \* \* \*